United States Patent [19]

Cirjak et al.

[11] Patent Number: 4,789,538

[45] Date of Patent: Dec. 6, 1988

[54] METHOD OF PREPARING AMMONIA AND AMMONIA SYNTHESIS CATALYSTS

[75] Inventors: Larry M. Cirjak, Burton; Richard P. Schmidt, Jr., Lima, both of Ohio

[73] Assignee: Standard Oil, Cleveland, Ohio

[21] Appl. No.: 74,736

[22] Filed: Jul. 17, 1987

[51] Int. Cl.$^4$ .............................................. C01C 1/04
[52] U.S. Cl. ................................ 423/362; 423/363; 502/175; 502/200; 502/302; 502/303; 502/304; 502/328; 502/330; 502/332; 502/335; 502/336
[58] Field of Search ................. 423/362, 363; 502/175

[56] References Cited

U.S. PATENT DOCUMENTS

| | | | |
|---|---|---|---|
| 1,184,839 | 5/1916 | Ellis | 423/362 |
| 1,352,174 | 9/1920 | Clancy | 423/363 |
| 1,352,179 | 9/1920 | Clancy | 423/363 |
| 1,352,180 | 9/1920 | Clancy | 423/363 |
| 1,352,181 | 9/1920 | Clancy | 423/363 |
| 1,352,182 | 9/1920 | Clancy | 423/363 |
| 1,363,392 | 12/1920 | Clancy . | |
| 1,439,292 | 11/1922 | Clancy . | |
| 1,452,027 | 4/1923 | Cederberg | 423/363 |
| 1,454,599 | 5/1923 | Clancy . | |
| 1,476,283 | 12/1923 | Cederberg | 423/363 |
| 1,483,412 | 2/1924 | Clancy | 423/363 |
| 1,589,682 | 6/1926 | Cederberg et al. . | |
| 1,750,551 | 3/1930 | Uhde . | |
| 4,142,993 | 3/1979 | Elofson et al. | 252/447 |
| 4,163,775 | 8/1979 | Foster et al. | 423/363 |
| 4,250,057 | 2/1981 | Foster et al. | 252/447 |
| 4,271,136 | 6/1981 | Tennison | 423/362 |
| 4,309,311 | 1/1982 | Johnson et al. | 252/438 |
| 4,348,370 | 9/1982 | Johnson et al. | 423/362 |
| 4,588,705 | 5/1986 | Vanderspurt et al. | 502/177 |

FOREIGN PATENT DOCUMENTS 0171296 8/1985 European Pat. Off. .
740274 2/1978 U.S.S.R. .
2114461 8/1983 United Kingdom .

OTHER PUBLICATIONS

Chemical Abstracts, vol. 90, No. 157737b and 157738c, p. 348, Badik et al. and Lyubchenko et al., respectively.
Journal of Catalysts 44 (pp. 236-243) (1976) "Rare Earth Intermetallics as Synthetic Ammonia Catalysts"; Takeshita et al.
"Possibility of Obtaining Ammonia Synthesis Catalysts on the Basis of Cyano Complexes of Certain d-Metals" UDC 541, 128 & 546.171.07, Sergeeva et al., 1984, Plenum Publishing Corporation.

Primary Examiner—John Doll
Assistant Examiner—Wayne A. Langel
Attorney, Agent, or Firm—Larry W. Evans; David J. Untener; Michael F. Esposito

[57] ABSTRACT

A process for producing ammonia comprising selecting a catalyst precursor characterized by the formula:

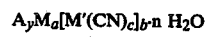

$$A_y M_a [M'(CN)_c]_b \cdot n\, H_2O$$

wherein
A is an alkali or alkaline earth metal or mixture thereof;
M is La, Ce, Pr, Nd, Pm, Sm, Eu, Gd, Tb, Dy, Ho, Er, Tm, Yb, Sc, Lu and Y or mixtures;
M' is a group VIII metal, preferably Fe, Co, Ni or Ru or mixtures;
a=0.1 to 4;
b=0.1 to 4;
c=4 to 6; and
provided that the catalyst is free or substantially free of Al or the combination of Al and U, activating the precursor by heating in a non-oxidizing atmosphere and pass $N_2$ and $H_2$ over the activated catalyst to produce ammonia.

6 Claims, No Drawings

METHOD OF PREPARING AMMONIA AND AMMONIA SYNTHESIS CATALYSTS

BACKGROUND OF THE INVENTION

The present invention is directed to a novel procedure for preparing ammonia and an ammonia catalyst. In particular, the present invention is directed to the use of a lanthanide promoted Group VIII metal cyanide salt as a catalyst for the production of an ammonia catalyst and a novel method of producing these catalysts. In addition, the lanthanide promoted Group VIII cyanide catalyst may also include an alkali and/or alkaline earth metal as a promoter.

The use of hexacyanate salts of the Group VIII transition metals as precursors for ammonia synthesis catalysts have been known. In addition, the use of alkali or alkaline earth metal salts of the Group VIII metal hexacyanate complexes in particularly Fe, as precursors for ammonia synthesis catalysts has been reported in the patents issued to Clancy (U.S. Pat. Nos. 1,439,291; 1,454,599; and 1,363,392). Moreover, the patents to Johnson et al., U.S. Pat. Nos. 4,348,370 and 4,309,311 are directed to the use of alkali or alkaline earth promoted Fe and Co hexacyanocobaltate and hexacyanoruthenate as catalysts for synthesis of ammonia.

In Chemical Abstracts, Volume 90, 1979, Nos. 157737–157739, the use of rare earth metals in combination with U and/or aluminum and hexacyanoferrate complexes are disclosed as ammonia catalyst. In addition, the use of intermetallic alloys which are based on the combination of a rare earth metal and a Group VIII metal have also been disclosed as suitable for ammonia synthesis catalysts. Such Russian Patent Author Certificate No. 740,274 and the Takeshita et al. article in the *Journal of Catalysts*, Volume 44, pgs. 236–243.

Recently, EPO Patent Application No. 171,296 (U.S. Pat. No. 4,588,705) was published and discloses a dual colloid catalyst system which may be utilized for the production of ammonia. The dual colloid catalyst of this application is prepared by forming a gel or suspension of a transition metal cyano containing anionic complex and a solution containing metal cations wherein at least one metal is non-reducible and selected from Cr, Al, Th, U, lanthanides and Group IIA. This gel or suspension is then heated in an acidic environment at 90° C. to 150° C. to allow hydrolysis and polymerization to occur forming a precursor which is subsequently activated in hydrogen to produce the active catalyst. Example 5 of this patent application discusses the x-ray diffraction results of this type of catalyst precursor identifying the precursor as small crystallites of a RuRu (CN)$_6$ type material.

While each of these patents or articles teaches catalysts having significant catalytic effect in the production of ammonia from nitrogen and hydrogen they have significant limitations. For example, the rare earth—Group VIII metal catalysts which are based on intermetallic alloys have a significant limitation in that the surface area of the catalysts produced is extremely small. In order to achieve a surface area of even 1 m$^2$/g, these intermetallics must be ground to fine particles prior to use. While this technique is suitable for low pressure laboratory experiments such as those carried out in the Russian Patent and the work discussed in the Takeshita paper, it is completely unsuitable for the present day commercial environment because the use of fine powders will lead to undesirable pressure drops in the reactor. Moreover, this grinding technique is quite costly. Finally, the intermetallic alloys are not readily suitable for incorporation of promoters. The catalyst disclosed in Chemical Abstracts article has the attendant disadvantage that they require the presence of U which is not a desired material due to its handling problems. The catalyst disclosed in EPO Patent Application No. 171,296 or U.S. Pat. No. 4,588,705 requires a complex preparation technique including heating in an acidic solution for an extended period of time to produce a dual colloid precursor. This technique is unacceptable from the standpoint of complexity and economics. The present invention is directed to a novel process of producing ammonia and a catalyst preparing ammonia catalyst which substantially alleviates these problems.

SUMMARY OF INVENTION

It is the primary object of the present invention to provide a process for the production of ammonia.

It is further object of the present invention to provide a process for the production of ammonia utilizing a microporous high surface area catalyst.

It is still another object of the present invention to provide a novel process for the production of ammonia catalyst.

Additional objects, advantages and novel features of the invention will be set forth in part in the description which follows, and in part will become apparent to those skilled in the art upon examination of the following or may be learned by the practice of the invention. The objects and advantages of the invention may be realized and obtained by means of the instrumentalities and combinations particularly pointed out in the appended claims.

To achieve the foregoing and other objects in accordance with the purpose of the present invention as embodied and broadly described herein, the process of preparing ammonia according to the present invention comprises (1) selecting a catalyst precursor characterized by having the formula:

$$A_yM_a[M'(CN)_c]_b \cdot nH_2O$$

where
y=0 to 4, preferably greater than 0,
a=0.1 to 4,
c=4 to 6,
b=0.1 to 4,
n=0 to 30,
A=alkali or alkaline earth metals or mixtures thereof,
M=La, Ce, Pr, Nd, Pm, Sm, Eu, Gd, Tb, Dy, Ho, Er, Tm, Yb, Sc, Lu and Y or mixtures thereof,
M'=Group VIII metals, preferably Fe, Co, Ni, or Ru or mixtures thereof, wherein said catalyst is free or substantially free of Al and the combination of Al and U, (2) activating said precursor by heating said precursor in a non-oxidizing atmosphere at a temperature between 275° C. to 450° C. and (3) passing N$_2$ and H$_2$ over said catalyst at an elevated pressure and non-oxidizing atmosphere to a temperature between 200° C. to 450° C. to produce ammonia.

The surface area of the catalyst is greater than 1 m$^2$/g, preferably greater than 10 to 15 m$^2$/g.

In a further aspect of the present invention and in accordance with its purposes and objects, the process of producing the above-described catalyst precursor comprises (1) mixing an aqueous Group VIII metal cyanide salt solution with an organic solution containing a rare earth metal salt to form a precipitate having the formula:

$$A_yM_a[M'(CN)_c]_b \cdot nH_2O .$$

wherein y, a, b, c and n are defined previously and (2) separating the precipitate from the precipitant.

In a preferred embodiment of this aspect of the present invention the process further comprises adding a colloidal solution containing a support material for the catalyst precursor to the organic solution prior to mixing with the aqueous solution containing the Group VIII metal cyanide salt.

In a further preferred aspect of this invention, the catalyst has the formula $$A_yM_a[M'(CN)_c]_b \cdot nH_2O$$

where
y=0 to 4,
a=0.1 to 4;
c=4 to 6;
b=0.1 to 4;
n=0 to 30;
A=alkali or alkaline earth metals or mixtures thereof;
M=La, Ce, Pr, Nd, Pm, Sm, Eu, Gd, Tb, Dy, Ho, Er, Tm Yb, Sc, Lu and Y or mixtures thereof;
M'=Group VIII metal or mixtures thereof;
comprising (1) mixing an aqueous solution containing a Group VIII metal cyanide salt with an organic solution containing a rare earth metal salt to form a precipitate characterized by said formula and (2) separating said precipitate from the precipitant.

The significance of the ammonia catalysts of the present invention made by the process of the present invention is that they exhibit significant activity at lower temperatures compared to conventionally prepared commercial ammonia catalyst. Therefore, the catalyst of the present invention posesses an overall activity at a given temperature which exceeds those of the commercially available catalysts. This results in lower temperature and pressure requirements for the catalytic conversion of nitrogen and hydrogen to ammonia. In fact, during the treatment of the precursor to form the activated catalyst ammonia production was observed at temperatures as low as 240° C.

Reference will now be made in detail to the present preferred embodiments of the present invention.

DETAILED DESCRIPTION OF THE INVENTION

The process of producing ammonia in accordance with the present invention comprises (1) selecting a catalyst precursor characterized by the formula $$A_yM_a[M'(CN)_c]_b \cdot nH_2O$$

where
y=0 to 4,
a=0.1 to 4,
c=4 to 6,
b=0.1 to 4,
n=0 to 30,
A=alkali or alkaline earth metals or mixtures thereof;
M=La, Ce, Pr, Nd, Pm, Sm, Eu, Gd, Tb, Dy, Ho, Er, Tm, Yb, Sc, Lu and Y or mixtures thereof;
M'=Group VIII metal, preferably Fe, Co, Ni, or Ru or mixtures thereof;
wherein the precursor is substantially free of Al and the combination of Al and U, (2) slowly heating the precursor in a non-oxidizing atmosphere to a temperature between about 275° C. to 450° C. to activate the catalyst precursor and (3) Passing $N_2$ and $H_2$ over said catalyst at an elevated temperature of between 200°–450° C. and an elevated pressure to produce ammonia. Typically, the total time for heating to activate the catalyst precursor is between about 12 to 96 hours.

In a further preferred embodiment of the present invention the heating rate for activation is below about 3° C. per minute. Most preferably between 0.1° to 0.5° C. per minute, especially preferred is between 0.1° to 0.2° C./minute.

In a further preferred embodiment of this aspect of the present invention the non-oxidizing atmosphere is either argon, nitrogen, hydrogen, ammonia or mixtures thereof. Preferably, the gases are highly purified (e.g. substantially free of oxygen containing species). Most preferably the non-oxidizing atmosphere comprises a mixture of highly purified ammonia with either nitrogen and/or hydrogen.

The activated catalyst precursor is at least partially amorphous and microporous possessing a surface area greater than 1 $m^2$/g, preferably greater than 10 to 15 $m^2$/g.

In another preferred embodiment of this aspect of the present invention, M is selected cfrom the group consisting of La and Ce or mixtures thereof.

In still another preferred embodiment of this aspect of the present invention, M' is selected to be Fe or Ru.

In another preferred embodiment of the present invention y>0.

In a still further preferred embodiment of the present invention a=1 to 4 and b=1 to 3.

In another preferred embodiment of the present invention the $N_2$ and $H_2$ are passed over the catalyst at a temperature of between 200°–475° C., a pressure between 1000 to 2000 psi and a space velocity of between about 1500 to 50000 SV/hr. Preferably, the temperature is between 325° to 425° C., the pressure is between 1200 to 1500 psi and the space velocity is 5000 to 25000 SV/hr. The mole ratio of $H_2$ to $N_2$ in the reaction is between 5:1 to 1:5. Preferably, the ratio of $H_2/N_2$ is 3/1 to 2/1.

In still another preferred embodiment of the present invention, the catalyst precursor is supported. In particular, uexpectedly superior results have been obtatined with Lewis base materials such as alkali oxides, alkaline earth oxides, Group IIIA oxides (e.g. yttria or rare earth oxides), Group IVA oxides (e.g. $TiO_2$) and Group VA oxides (e.g. $Nb_2O_3$) as supports for the catalyst of the present invention. Specifically, suitable support materials for the precursor are titania, graphite, zirconia, ceria, yttria, magnesia, and Zn titanate. Most preferably, the support material comprises graphite, ceria, zirconia, titania. The use of these types of supports provides usually good results when compared with support material such as silica and alumina. It is also envisioned that high surface area supports such as metal carbides or nitrides that possess or can be treated to possess the same electron properties as the Lewis base materials would be suitable in the practice of the present invention.

PREPARATION OF THE CATALYST PRECURSOR

The catalyst precursors characterized by the formula set forth above can be readily prepared by using commercially available starting materials. The starting materials for the precursor have been reported as reacting slowly in air to form undesirable products. However, the process of the present invention may be performed in air without any serious problem because the reaction proceeds quickly and starting materials are not exposed to air for a sufficient time to enable formation of the undesirable products. In general, two techniques have been used in the synthesis of these materials. The first technique produces crystalline powders of these materials and comprises: slowly adding a solution containing a slight excess of a rare earth nitrate salt to a salt solution of an alkali or alkaline earth Group VIII metal cyanide. A precipitate was formed almost immediately upon addition of the rare earth solution. The precipitate was filtered under suction, washed with water, and then washed with acetone or absolute alcohol to facilitate drying. It was then dried for about 1 hour in air or a dessicator to form a powder.

The second technique produces crystals with the dimension of 1 to 3 millimeters,. These crystals are obtained by slow diffusion according to the following general technique. A 5 mL aliquot portion of the rare earth metal nitrate was carefully placed in a test tube taking precaution to avoid excess contact with the walls of the test tube. The solution was then frozen by emersion of the test tube into a dry ice/acetone bath. A 1 mL aliquot of water was then slowing added and allowed to freeze. Finally, a 5 mL aliquot of alkaline Group VIII metal cyanide solution (approximately 1 molar) was added and allowed to freeze. The frozen solutions were then allowed to thaw slowly to room temperature. Crystal growth occurred slowly at the interface of the two layers by diffusion. Generally, crystal growth was complete after about 3 days. The crystals were then washed and dried in the same manner as the powder samples discussed previously.

The general procedure discussed above can be modified by the use of water soluble salts of the rare earth materials such as acetates and chlorides. In addition, the use of a transition metal cyanide solution which does not contain alkaline clearly is envisioned in the practice of the present invention. It should be understood that this is equally applicable to the specific procedure described below.

A further object of the present invention is directed to a new and improved process for preparation of the catalyst precursor described previously. In general, this process comprises mixing an aqueous solution containing a Group VIII metal cyanide salt with an organic solution (e.g. alcohol) containing a rare earth metal salt to form a precipitate comprising the catalyst precursor and separating the precipitate from the liquid (e.g. filtration).

Preferably, the cyanide metal salt is promoted with an alkali or alkaline earth metal, in particular $K_4Fe(CN)_6$ is especially useful. Typical rare earth metal nitrates, such as $Ce(NO_3)_3$ are used as the rare earth metal salt and methanol is utilized to form the organic solution.

In a further preferred embodiment of this aspect of the present invention the process further comprises adding a colloidal solution containing a support material for the catalyst to the organic solution prior to mixing with the aqueous solution containing the cyanide salt. The colloidal solution can be either aqueous or organic, however, a colloidal solution containing a substantial amount of organic solvents such as methanal or especially preferred. Furthermore, a ceria sol is especially preferred to provide the support material (ceria oxide) for the catalyst precursor.

The following examples are set forth to illustrate the process of preparing ammonia according to the present invention.

EXAMPLE I

Large crystals of cerium hexacyanocobaltate(III) were prepared in the following manner. A 5 mL aliquot of a 0.8M solution of cerium(III) nitrate (Alpha) was carefully placed in a 16 mm diameter test tube taking precaution to avoid excess contact with the walls of the test tube. This solution was then frozen by immersion of the test tube into a dry ice/acetone bath. A 1 mL aliquot of distilled water was carefully added above the previously frozen layer and allowed to freeze. Finally, a 5 mL aliquot of a 0.8M solution of potassium hexacyanocobaltate(III) (Alpha) was added and allowed to freeze. This smaller test tube was then placed inside a larger one (20 mm diameter) and left to stand at room temperature. After thawing, the slow diffusion of the two layers into each other resulted in the formation of crystals with dimensions as large as 3 mm. After 2-3 days the crystals were filtered from the solute under vacuum and washed with water and methanol before allowing to dry in air. This procedure was carried out in a number of test tubes simultaneously in order to obtain enough of the off-white crystals for catalyst testing. The 30-40 mesh sized precursor crystals obtained were then heat treated under a flow of 3/1 hydrogen/nitrogen at a temperature between 300° C.-450° C. for at least about 40 hours to activate the catalyst hereinafter referred to as Catalyst A. The rate of heating the catalyst was about 6° C./hour.

EXAMPLE II

In the same manner as set forth in Example I, 30-40 mesh crystals of lanthanum hexacyanocobaltate(III) were prepared from 0.8M solutions of lanthanum nitrate (Alpha) and potassium hexacyanocobaltate(III). This material was subsequently heat treated as set forth in Example I to form Catalyst B.

EXAMPLE III

Large crystals of cerium hexacyanoferrate(III) were also prepared in the same manner as set forth in Example I using 0.85M solutions of potassium hexacyanoferrate(III) and cerium(III) nitrate. The 30-40 mesh brown crystals obtained from this reaction were heat treated as in Example I to form Catalyst C.

The following examples are illustrative of the process of the present invention wherein the catalyst is placed on a support.

EXAMPLE IV

Cerium hexacyanocobaltate(III) powder was prepared in the following manner. A solution of cerium(III) nitrate (Alpha, 86.8 g in 50 mL water) was added slowly to a solution of potassium hexacyanocabaltate(III) (Alpha, 66.4 g in 50 mL water) under constant stirring. A white precipitate was formed almost immediately upon the combination of the two solutions. After about one hour, the white powder was separated from the filtrate by vacuum filtration. The sample was then washed with methanol (100–150 mL) two times and finally dried for about one hour in air to form a powder.

The supported precursor was prepared by adding 30 g of colloidal ceria (NYACOL, 20.6% $CeO_2$, acetate stabilized) to 1.25 g of the dried (ceriumhexacyanocobaltate) powder. Blending of these components resulted in the formation of a pale yellow gelatinous mixture. The mixture was then left to dry in air at room temperature. After about two days a pale yellow solid was obtained. This material was then broken up and screened. The 10–20 mesh particles were subsequently heat treated according to Example I to form Catalyst D.

EXAMPLE V

Cerium hexacyanoferrate(III) powder was prepared by the reaction of a solution of cerium(III) nitrate (Alpha, 100 g in 100 mL water) with a solution of potassium hexacyanoferrate (Alpha, 75.7 g in 100 mL) under constant stirring. A brown precipitate was formed almost immediately upon the combination of the two solutions. After about ½ hours, the red-brown powder was obtained by a vacuum filtrate. This material was washed once with water (50 mL) and two times with 150 mL of methanol.

The supported precursor crystals were prepared in a similar manner to that set forth in Example IV utilizing 30 g of colloidal ceria and 12 g of cerium hexacyanoferrate(III) powder. The 10–20 mesh gray-brown particles obtained were subsequently heat treated according to Example I to form Catalyst E.

EXAMPLE VI

Catalyst F was prepared as set forth in Example IV using 1.5 g of ceriumferricyanide powder and 15 g of colloidal ceria.

EXAMPLE VII

Catalyst G was prepared from 17.2 g of potassium cerium hexacyanoferrate (II) and 11 g solids equivalent of an acetate stabilized colloidal ceria (NYACOL, 20.6% $CeO_2$, acetate stabilized).

The potassium cerium hexacyanoferrate (II) was prepared by the reaction of cerium nitrate (14 g in 50 mL $H_2O$) with a solution of potassium hexacyanoferrate (II) (10 g in 50 mL $H_2O$) as described in Example I.

CATALYST TESTING

The active catalyst of Examples I to VI were tested in a reactor to determine catalytic activity.

The catalytic activity of these materials was measured as a function of temperature, pressure and space velocity once the volume percent ammonia in the product stream reached about 0.1–0.2% ammonia as determined by gas chromatography.

The results obtained by the use of the catalyst are set forth below in Table I.

TABLE I

| Example No. | Catalyst | Temp °C. | Press psi | SV/Hr. S.Vel. | Vol % $NH_3$ | Ratio $H_2/N_2$ |
|---|---|---|---|---|---|---|
| I | A | 299 | 1400 | 5232 | 1.50 | 3/1 $H_2/N_2$ |
|   |   | 310 |   |   | 1.87 |   |
|   |   | 320 |   |   | 2.27 |   |
|   |   | 350 |   |   | 3.60 |   |
|   |   | 427 |   |   | 7.69 |   |
| II | B | 342 | 1400 | 5300 | 2.24 | 3/1 $H_2/N_2$ |
|   |   | 352 |   |   | 2.48 |   |
|   |   | 363 |   |   | 2.80 |   |
| III | C | 366 | 1200 | 4040 | 4.55 | 3/1 $H_2/N_2$ |
|   |   | 356 |   |   | 3.76 |   |
|   |   | 377 |   |   | 5.16 |   |
|   |   | 347 |   |   | 2.70 |   |
| IV | D | 393 | 1250 | 1850 | 1.57 | 3/1 $H_2/N_2$ |
|   |   | 413 |   | 1850 | 1.99 |   |
|   |   | 437 |   | 1850 | 2.54 |   |
|   |   | 423 |   | 5500 | 1.51 |   |
|   |   | 389 |   | 5500 | 1.14 |   |
| V | E | 419 | 1250 | 1450 | 6.46 | 3/1 $H_2/N_2$ |
|   |   | 376 |   | 1450 | 5.36 |   |
|   |   | 334 |   | 1450 | 3.35 |   |
|   |   | 420 |   | 3800 | 4.26 |   |
|   |   | 400 |   | 3800 | 3.59 |   |
| VI | F | 458 | 1250 | 7700 | 3.58 | 3/1 $H_2/N_2$ |
|   |   | 423 |   |   | 2.79 |   |
|   |   | 400 |   |   | 2.47 |   |
|   |   | 389 |   |   | 2.22 |   |
| VII | G | 455 | 1500 | 23000 | 14.55 | 2/1 $H_2/N_2$ |

The following examples are set forth below to illustrate the results obtained with a catalyst prepared by the process of the present invention.

EXAMPLE VIII

Catalyst H was prepared by the reaction of 14.3 g of potassium ferrocyanide in 3500 mL of $H_2O$ with 14.7 g of cerium nitrate in 1800 mL of $H_2O$. The precipitate was then allowed to settle out from the solution and the filtrate was then decanted from the precipitate. The precipitate was then washed with 500 mL with water, allowed to settle, and then decanted again. The remaining slurry was then diluted again to 500 mL with water. Under stirring, a solution of 10 g of ceria sol (nitrate stabilized, 19.8% solids) diluted to 500 mL with water was then added to the slurry of the white precipitate. The reaction of the two mixtures produced a purple precipitate. The solid was then isolated from the liquid by vacuum filtration. A soft, powdery solid was obtained.

The surface area of the precursor was 17.9 $m^2/g$. The total pore volume as measured by mercury porosimetry was 0.64 cc/g with 0.03 cc/g of that for pores of radii <4500 Å. The partical density of this material was 0.99 g/cc.

Secondary Electron Images (SEI) of the precipitate (prior to the addition of the ceria sol) slow aggregates of crystals with dimensions ranging from about 2–5 μm (micrometers) in size. The SEI of the material following the addition of the ceria sol were quite similar to those without the sol. The main difference was a general smoothing out of the crystalline features as the sol coated the surface and filled in some of the smaller gaps in the aggregate.

EXAMPLE IX

Catalyst I was prepared by the reaction of 14.3 g of potassium ferrocyanide in 150 mL of water with a saturated methanol solution containing 14.7 g of cerium nitrate. The precipitate was then isolated and washed in the same manner as was done for Catalyst H. Again, 10 g of the ceria sol diluted to 500 mL with water was then added to the slurry of the white precipitate diluted to 500 mL with water. The purple solid was then separated from the filtrate by vacuum filtration. The solid obtained was stronger than the catalyst of Example VIII.

The surface area of the catalyst precursor was 28.3 $m^2/g$. Its total pore volume was 0.31 cc/g and consisted primarily of pores of radii <4500 Å. Most of the pore radii were in the range of 1000–1500 Å. The particle density was found to be 1.39 g/cc. The most striking features of the SEI of the initial precipitate (prior to the addition of ceria sol) is that the aggregates are comprised from much smaller crystallites than those from the aqueous preparation. The dimensions of these crystallites are generally about 0.5 μm or less. The addition of the sol to the initial precipitate again leads to a loss of crystalline definition and a filling of the spaces between the particle.

The second advancement in our catalyst preparation procedure centers upon carrying the precipitation/-reaction to form the active phase material in the presence of the sol support/dispersant. This change of procedure has dramatically changed the physical properties and the catalyst activities of the catalysts that have been produced. It has also been found that solvent effects are also significant for this new procedure. The following experiments demonstrate the benefits of this new procedure.

EXAMPLE X

Catalyst J was prepared in the following manner. A 22 g portion of ceria sol (AESAR, nitrate stabilized, 22% solids) was diluted to about 50 mL with water. Another solution containing 9 g of cerium nitrate in 50 mL of water was also prepared. The cerium nitrate solution was gradually added to the sol solution along with additional water so as to keep everything in a stable suspension/solution. The final volume was about 225 mL. A solution of 8 g of potassium ferrocyanide in 25 mL of water was then added to the above solution/-suspension. A purple precipitate was formed immediately upon the mixture of the two solutions. The material used for the catalyst experiments was isolated from the liquid by vacuum filtration through a fritted funnel. A light purple solid was obtained that was harder tha the previous examples (VIII and IX) and was not chalky.

The surface area for the precursor to Catalyst J was 56.7 $m^2/g$. The total pore volume of this material was 0.44 cc/g with 0.083 cc/g of that residing in pores of radii less than 4500 Å. The particle density of this material was found to be 1.2 g/cc. Unlike the previous two examples, identification of the ferrocyanide-based component in the sol matrix is not readily apparent from the SEI photographs. X-ray spectra (EDAX) did indicate that there was some heterogeneity in the material. (Some regions were more ceria rich than others.)

EXAMPLE XI

Catalyst K was prepared in a manner to take advantage of the above improvement as well as the utilization of methanol as solvent. A 24.4 g portion of Nyacol ceria sol (nitrate stabilized, 19.8% solids) was diluted to about 200 mL with methanol. In a manner similar to that described in the previous example, a stable suspension/-solution of the sol and 9.4 g of cerium nitrate was prepared that contained about 850 mL of methanol and 150 mL of water. This was then reacted with a solution of potassium ferrocyanide in approximately 70 mL of water to give a purple precipitate. The solid was then isolated in the same manner as the previous example. The pink solid that was obtained was the densest and hardest of all the catalysts described. Catalysts H to K were then used to produce ammonia according to the following procedures.

The surface area of the precursor to Catalyst K was found to be 73.1 $m^2/g$. The total pore volume of this material was determined to be 0.11 cc/g all of which were of radii less than 4500 Å. In fact, the majority of the pores had radii that were less than 200 ÅA. The particle density of this material was 2.17 g/cc. The SEI photographs of this material were relatively featureless compared to the previous examples. On the scale employed (X 10000) the EDAX results indicate that the material is fairly homogeneous.

EXAMPLES XII AND XIII

Catalysts H (30–40 mesh, 4.4 cc, 2.275 g) and I (30–40 mesh, 3 cc, 2.271 g) were then tested for ammonia synthesis under 3/1 hydrogen/nitrogen at 1450 psi. At comparable linear gas velocities and temperatures, the activity for ammonia synthesis of Catalyst I was better than that of Catalyst H. On a volume of gas/volume of catalyst basis, the activity of Catalyst I was some 10–15% more active than that of Catalyst H. Thus the increase in the physical integrity of Catalyst B relative to Catalyst A was also accompanied by a significant increase in overall catalytic activity.

EXAMPLES XIV AND XV

Catalysts J (30–40 mesh, 3 cc, 1.939 g) and K (30–40 mesh, 3 cc, 3.132 g) were tested for catalytic activity in the same manner as for Catalysts H and I. (Note that Catalyst K possesses the largest bulk density of all the catalysts tested. It was also physically the strongest one that we tested.) Under comparable conditions, the activity for ammonia synthesis of catalyst K was significantly better than for Catalyst J. In fact, Catalyst K was more active than any of the $KCeFe(CN)_6$/Ceria catalysts tested.

The following data set forth in Table II are representative of the activities observed for Catalysts H to J. Please note that the temperatures set forth in Table II are merely gas inlet temperature going into the catalyst bed and direct comparison to the results set forth in Table I is difficult.

TABLE II

| Catalyst | Inlet Temp °C. | cc/min 3/1 $H_2N_2$ | SV/Hr. | Vol % $NH_3$ |
|---|---|---|---|---|
| H | 371 | 550 | 7500 | 3.46 |
|   | 400 | 1150 | 400 | 4.6 |
| I | 371 | 500 | 10000 | 4.86 |
|   | 400 | 1150 | 23000 | 5.1 |
| J | 370 | 650 | 13000 | 5.38 |
|   | 391 | 1150 | 23000 | 5.86 |
| K | 370 | 650 | 13000 | 7.67 |
|   | 389 | 1200 | 24000 | 7.2 |

The results set forth in Tables I and II clearly demonstrate that the catalysts of the present invention have a remarkable ability to produce ammonia at relatively low temperatures. While not being limited to a particular theory, applicants have postulated that the high surface area observed for the ammonia catalysts produced by the process of the present invention is indicative of an extensive microporous structure. The microporous structure is obtained and retained by a careful heating of the catalyst precursor during the preparation of the active catalyst. If the samples are heated to quickly or to an extremely high temperature the microporous structure of the catalyst is destroyed or substantially reduced. Accordingly, the procedure for heating the catalyst to the elevated temperature is important in obtaining the desired property of high surface area of the catalyst. Furthermore, the selection of the preparation procedure utilizing an organic solvent and in situ dispersion of the catalyst precursor on the support material has a significant effect on the results obtained. In addition, Lewis base support materials (i.e. electron rich or ability to become electron rich) such as ceria and zirconia supported catalyst provide significantly superior results compared to silica or activated alumina.

Finally, from Examples VIII and IX, it is quite clear that carrying out the precipitation of the ferrocyanide-based component of the catalyst in the presence of an organic solvent produces much smaller crystallites of that material than if precipitated from aqueous solution. Moreover, utilizing the two-step preparation employed for Catalyst H and I, the use of smaller crystallites of the cyanide-based portion of the catalysts leads to materials of greater surface area than if larger crystallites are employed. These higher surface area forms are also stronger and more active catalytically for the ammonia synthesis reaction. Finally, utilization of the one-step catalyst preparation (for Catalysts J and K) leads to materials of significantly greater surface area and catalytic activity than of the materials prepared in two steps. (It is also easier and faster to carry out.)

Carrying out the one-step preparation of the catalyst in the presence of organic solvent is also advantageous over carrying out the synthesis in aqueous solvent. The surface area of Catalyst K (one-step, Methanol) was the greatest of this series. It was also the most active at low temperatures of the catalysts tested.

Qualitatively, the strength of the precursors correlates with the increase of particle density. (K>J>I>H)

The surface areas, pore structures and strengths of these materials can be varied over a wide range by varying preparative method, solvent, ratio of active phase to sol, concentration, et al. This allows for tailoring the design of the catalyst to the needs of a particular reaction and reactor design. Other factors, such as temperature and pH, will also play a role in the structures of the materials produced.

The foregoing description of the preferred embodiments of the invention have been presented for purposes of illustration and description. They are not intended to be exhausted or to limit the invention to the precise form disclosed, and obviously many modifications and variations are possible in light of the above teaching. The embodiments were chosen and described in order to explain the principals of the invention and its practical application to thereby enable others skilled in the art to best utilize the invention in various embodiments and with various modifications as are suited to the particular purpose contemplated. It is intended that the scope of the invention be defined by the claims appended hereto.

What is claimed as our invention is:

1. A process for producing ammonia comprising (1) selecting a catalyst precursor characterized by having the formula:

$$A_y M_a [M'(CN)_c]_b \cdot n H_2 O$$

where
y=0 to 4,
a=0.1 to 4;
c=4 to 6;
b=0.1 to 4;
n=0 to 30;
A=alkali or alkaline earth metals or mixtures thereof;
M=La, Ce, Pr, Nd, Pm, Sm, Eu, Gd, Tb, Dy, Ho, Er, Tm, Yb, Sc, Lu and Y or mixtures thereof;
M'=Group VIII metals or mixtures thereof;
wherein said precursor is substantially free of Al and the combination of Al and U, (2) slowly heating said catalyst precursor in a nonoxiding atmosphere to a temperature of between 275° to 450° C. to activate said precursor and (3) passing $N_2$ and $H_2$ over said activated catalyst at an elevated temperature and pressure to produce ammonia.

2. The process of claim 1 wherein M' is selected from the group consisting of Fe, Co, Ni, Ru or mixtures thereof.

3. The process of claim 1 wherein M is selected from the group consisting of La and Ce.

4. The process of claim 3 wherein y is greater than zero.

5. The process of claim 1 further comprising a support for said precursor.

6. The process of claim 5 wherein said support is selected from the group consisting of alkali metal oxide, alkaline earth metal oxides, Group IIIA oxides, Group IVA oxides and Group VA oxides.

* * * * *